Nov. 21, 1961     R. LEE     3,009,996
ADJUSTABLE MOTOR SPEED GOVERNORS
Filed Dec. 22, 1959     2 Sheets-Sheet 1
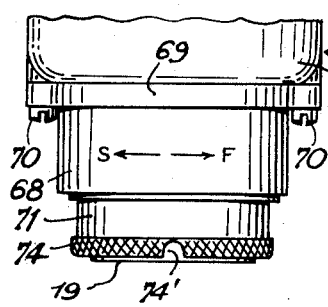
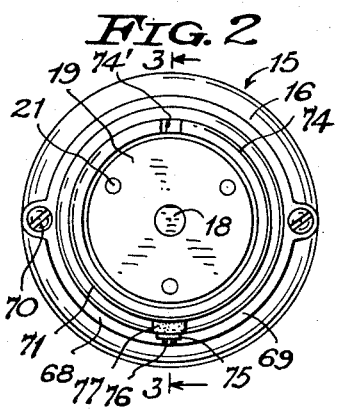
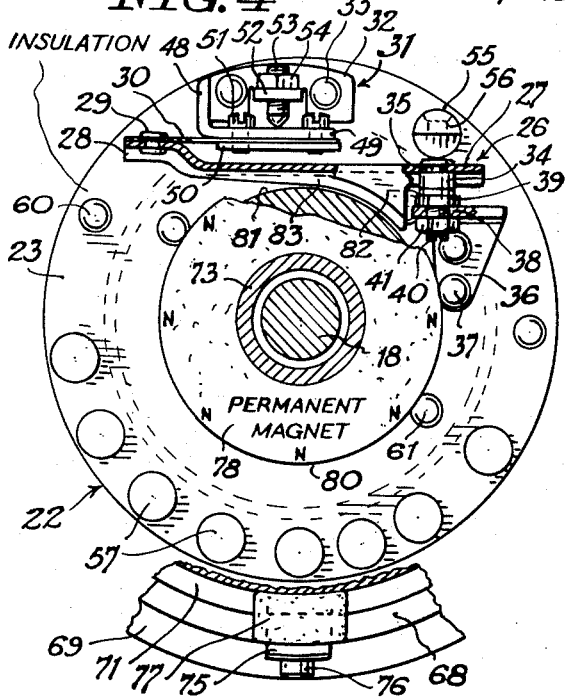
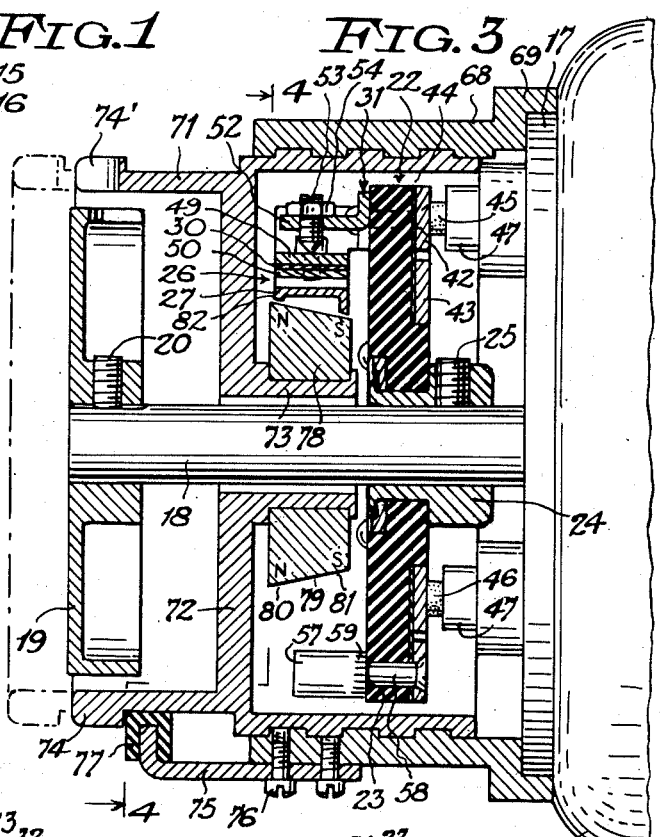
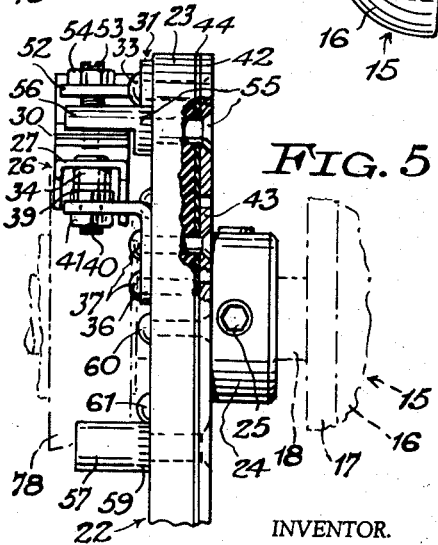
INVENTOR.
ROYAL LEE
BY
Christopher L. Waal
ATTORNEY Nov. 21, 1961 R. LEE 3,009,996
ADJUSTABLE MOTOR SPEED GOVERNORS
Filed Dec. 22, 1959 2 Sheets-Sheet 2
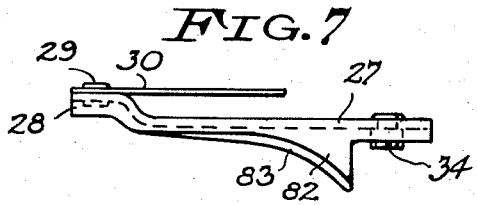
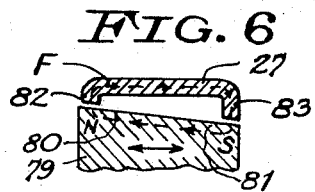
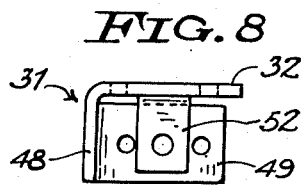
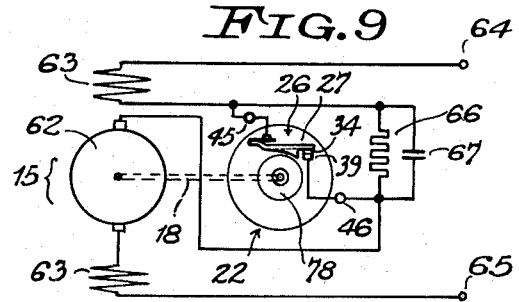
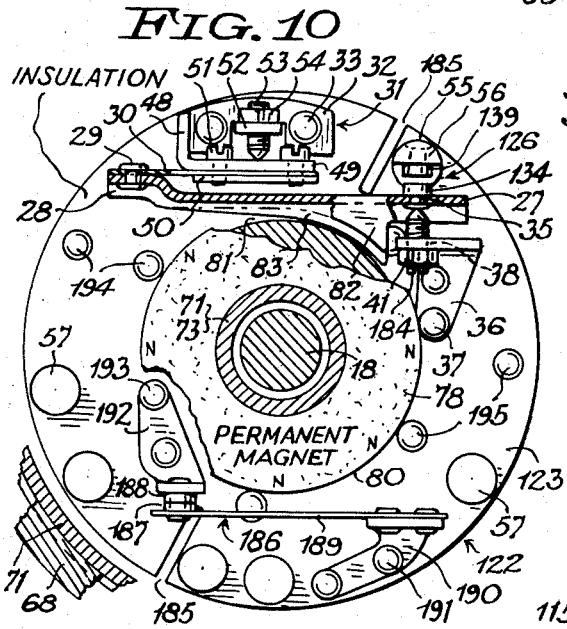
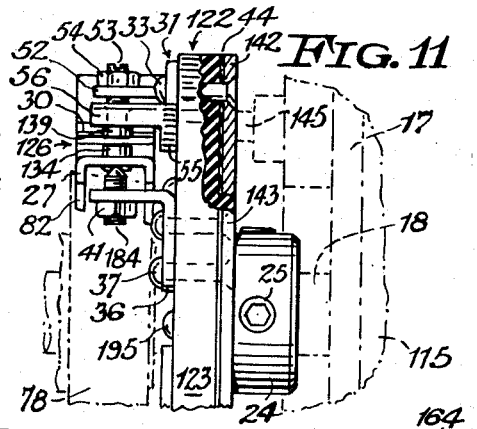
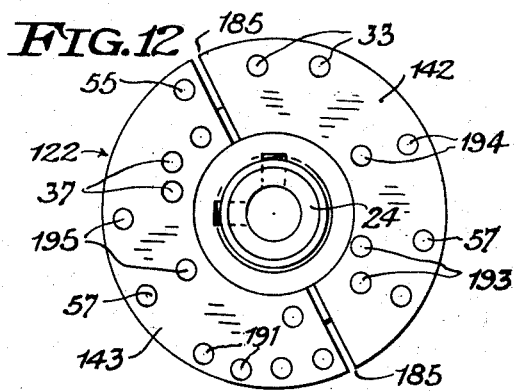
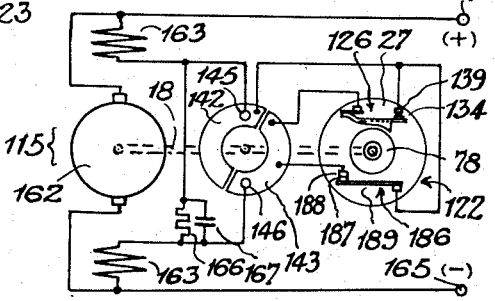
INVENTOR.
ROYAL LEE
BY Christopher L. Naal
ATTORNEY United States Patent Office 3,009,996
Patented Nov. 21, 1961

3,009,996
ADJUSTABLE MOTOR SPEED GOVERNORS
Royal Lee, Elm Grove, Wis., assignor to Lee Engineering
Company, Milwaukee, Wis., a corporation of Wisconsin
Filed Dec. 22, 1959, Ser. No. 861,248
14 Claims. (Cl. 200—80)

This invention relates to speed governors for electric motors and more particularly to governors of the centrifugal type and speed setting means therefor.

A well known type of motor speed governor, such as that disclosed in my United States Patent No. 1,630,394, issued May 31, 1927, and in my United States Patent No. 1,767,146, issued June 24, 1930, includes cooperating contacts which are periodically separated under the action of centrifugal force to regulate the power supply to the motor and thus maintain a predetermined constant motor speed. For some purposes it is desirable to adjust the governor speed setting while the motor is running, and various constructions have been devised for this purpose.

One of the objects of the invention is to provide a motor speed governor having improved speed setting means which is readily adjustable during operation of the motor to effect fine adjustment of the motor speed, and which requires no physical engagement or connection with rotating parts.

Another object is to provide a motor speed governor in which the speed setting is adjusted by magnetic means of simple and inexpensive construction.

Still another object is to provide a motor speed governor in which the magnetic speed-adjusting means comprises a magnet disposed coaxially of the motor shaft and so arranged as to facilitate assembly of the governor and access to the governor.

A further object is to provide a motor speed governor having an improved centrifugally influenced contact member and means for mounting and adjusting this member.

A still further object is to perfect details of construction generally.

The invention further consists in the several features hereinafter described and claimed.

In the accompanying drawings,

FIG. 1 is a fragmentary top plan view of an adjustable motor speed governor of the invention;

FIG. 2 is an end view of the governor;

FIG. 3 is a vertical longitudinal sectional view of the governor taken generally on the line 3—3 of FIG. 2;

FIG. 4 is a vertical transverse sectional view taken generally on the line 4—4 of FIG. 3;

FIG. 5 is a fragmentary edge view of a governor rotor;

FIG. 6 is an enlarged fragmentary sectional view of a governor contact arm and adjusting magnet therefor, taken in the same plane as FIG. 3;

FIG. 7 is a detail side elevation of the governor contact arm;

FIG. 8 is a plan view of a mounting bracket for the contact arm;

FIG. 9 is a wiring diagram of the motor governor;

FIG. 10 is a front view of a modified form of governor, parts being broken away and parts being shown in section;

FIG. 11 is a fragmentary edge view of the governor rotor of FIG. 10, parts being broken away and parts being shown in section;

FIG. 12 is a rear view of the governor rotor of FIG. 10, and

FIG. 13 is a wiring diagram of the motor governor of FIG. 10.

In the drawing, 15 designates an electric motor having a housing 16 with a circular end wall boss 17, and having a rotor shaft 18 which projects coaxially from the end wall boss. In the case of a motor for teleprinter or teletypewriter service, the shaft generally carries at its outer end a target disk 19 suitably secured to the shaft, as by a set screw 20, and provided with three equally spaced dots 21, FIG. 2, for use in stroboscopically checking the speed of the motor, as by means of a conventional tuning fork, not shown, having viewing slits.

A governor rotor 22 is secured to the motor shaft 18 to rotate therewith and comprises an insulating disk 23 having a hub 24 attached to the shaft by one or more set screws 25, the rotor being disposed near the end wall boss 17 of the motor housing. A centrifugal switch 26 is mounted on the disk 23 at the side thereof remote from the motor housing and includes a centrifugally influenced vibratory contact arm 27 which extends crosswise of the disk in radially spaced relation to the motor shaft and vibrates in a plane normal to the shaft axis. The arm has an outwardly offset end portion 28 which is secured, as by a rivet 29, to an end portion of a flat leaf spring 30 overlying the arm in generally parallel relation thereto. The other end portion of the spring projects toward the free end of the arm and is releasably clamped to a mounting bracket 31, hereinafter more fully described, having a flat base portion 32 secured to the disk by rivets 33. The free end portion of the vibratory arm has riveted or otherwise secured thereto an inwardly facing contact 34 which extends through an opening 35 in the arm. An angle bracket 36 is rigidly secured to the insulating disk by rivets 37 and has a threaded opening 38 in which is detachably secured a contact 39 cooperating with the vibratory contact 34, the contact 39 having a screw-threaded shank 40 retained in position by a lock nut 41.

At its rear face the insulating disk 23 carries a pair of flat outer and inner collector rings 42 and 43, the outer ring 42 being electrically connected to the mounting bracket 31 by the rivets 33, and the inner ring 43 being electrically connected to the angle bracket 36 by the rivets 37. A fibre sheet 44 is preferably interposed between the disk 23 and the collector rings. Axially extending brushes 45 and 46 bear on the respective collector rings and are carried in brush holders 47 secured to the end wall boss 17 of the motor housing. The brushes are connected in a motor circuit as hereinafter described.

The mounting bracket 31 includes a flange 48 bent from the end of the bracket toward the offset end portion 28 of the contact arm 27. Bent from the end flange 48 is a flat, slightly resilient tongue 49 which longitudinally overlies the leaf spring 30. The spring 30 is clamped between the tongue and a clamping plate 50 by screws 51 threaded into the plate. Bent from the mounting bracket base portion 32 at the outer side of the tongue 49 is a flat ear or lug 52 which lies in a plane substantially parallel to the tongue. A screw 53 is threaded through the ear and bears on the outer face of the tongue for angularly deflecting the resilient tongue and thus adjusting the bias of the leaf spring 30, the screw being locked in adjusted position by a nut 54. Outward maximum movement of the free end of the vibratory contact arm 27 is limited by a headed stud 55 secured to the insulating disk 23 and cut away to form a semi-cylindrical stop portion 56 overlying the arm.

At a peripheral region of the disk opposite the contact arm a plurality of headed balancing studs 57 are rigidly secured to the disk, each stud including a shank 58 which extends through the disk and is riveted to the outer collector ring 42. Each stud has adjacent to its shank a band of knurling 59 which forms teeth engaging the face of the insulating disk. The outer and inner collector rings are further secured to the disk by rivets 60 and 61, respectively.

The electric motor 15 whose speed is to be controlled or regulated by the governor may be of various types, and in the wiring diagram of FIG. 9 is shown to be of the series or universal type including an armature 62 and a series field comprising a pair of series-connected field sections 63, the armature being connected between terminals of the field sections, and the other terminals of the field sections being connected to alternating current line terminals 64 and 65. The centrifugal governor switch 26 is connected in series with the motor windings by way of the collector ring brushes 45 and 46, preferably at a point between one of the armature brushes and the adjacent field section, thus minimizing line disturbances incident to governor operation. The governor switch is shunted by the usual resistor 66 and capacitor 67, or either of these elements.

In the operation of the governor-controlled motor thus far described, the motor starts with the governor switch contacts 34 and 39 closed, and the motor accelerates to a predetermined speed at which the spring-biased contact arm 27 moves outwardly by centrifugal force, thus separating the arm contact 34 from the fixed contact 37 and introducing the resistor 66 in series with the motor windings. The motor current thereupon drops and the motor speed falls slightly, permitting the governor contacts to reengage. The cycle of operation is then repeated, the switch arm 27 vibrating rapidly, as from 50 to 500 cycles per second, and the motor speed being maintained constant within close limits. The speed at which the centrifugal switch contacts separate can be adjusted by moving the adjusting screw 53 in or out. By way of example, the governed motor speed may be 3600 r.p.m. in the case of a motor used in teletypewriter service. While the governor rotor may rotate in either direction, a clockwise rotation, as viewed in FIG. 4, is preferred in order to provide an anticipatory governor action.

According to a feature of the invention, the speed setting of the governor can be finely and accurately adjusted while the governor is in operation. An internally threaded cylindrical control housing 68 concentrically surrounds the governor rotor and has an internally rabbeted end portion 69 which fits over the circular end wall boss 17 of the motor housing and is secured to the motor housing by screws 70. Threaded into the control housing is an adjusting sleeve or dial 71 having therein an intermediate flat partition web 72 spaced from the vibratory contact arm 27 and provided with an inwardly projecting tubular hub 73 through which the motor shaft 18 extends, the web 72 being disposed between the governor disk and the target disk. The outer cylindrical portion of the adjusting sleeve surrounds the target disk and is provided with a knurled bead or rim 74. A notch 74' is formed in the bead for access to the set screw 20 for the target disk. An arm 75 is secured to the lower side of the governor housing member, as by screws 76, and carries an inwardly directed friction or detent shoe 77 bearing on the periphery of the adjusting sleeve to retain the sleeve in angularly adjusted position. The control housing 68 carries direction legends S and F, FIG. 1, to indicate the proper adjustment of the sleeve.

The tubular hub 73 of the adjusting sleeve rigidly carries thereon a permanent magnet 78 in the form of an annular slug, such as of Alnico V, having a conical periphery 79 concentric with the motor shaft. The slug is magnetized to form thereon peripheral polarized bands 80 and 81 of opposite polarity, the polarized bands being axially spaced and each providing a uniform radial field of flux. The vibratory contact arm 27, which also forms a heat-radiator, is of magnetizable metal such as steel, and is of channel cross-section, the arm including side flanges 82 and 83 parts of which are concavely shaped at their edges and are of different radius to overlie the conical periphery of the annular magnet 78 in substantially concentric relation thereto, there being air gaps between the flange edges and the magnet periphery. The flux path F through the magnet and the flanged contact arm is indicated in FIG. 6. Instead of making the entire contact arm of magnetizable metal, the arm may be provided with a separate magnetizable member of similarly flanged shape.

When the motor is running, the flanged magnetizable contact arm 27 revolves around the stationary magnet and is subject to a substantially uniform magnetic attraction which exerts a biasing effect on the arm, augmenting the biasing effect of the spring 30, to determine the speed setting of the governor. If it is desired to reduce the motor speed the magnet-carrying adjusting sleeve 71 is manually screwed outwardly, thus increasing the air gaps between the magnet and the flanges of the contact arm. This reduces the magnetic biasing force on the arm and causes the contacts to separate at a lower speed. Conversely, if the adjusting sleeve is screwed inwardly, the air gaps will be reduced, increasing the biasing force on the arm and causing the contacts to separate at a higher speed. In the case of a motor which is to run at a fixed predetermined speed, as in a teletypewriter service, the speed setting is facilitated by stroboscopically checking the motor speed during the manipulation of the adjusting sleeve. In teletypewriter service, the motor may run for long periods before speed correction is required.

In some instances, as for facilitating remote control, the permanent magnet 78 may be replaced by a similarly shaped spool-type electromagnet having similarly disposed peripheral pole faces, in which event no axial displacement of the magnet would be required.

The vibratory contact arm 27 and its supporting leaf spring 30 form a unit assembly, as seen in FIG. 7, which can be readily mounted on the governor disk and which can be easily and inexpensively replaced if the contact 34 thereon becomes worn. It is also possible to provide interchangeable contact arm assemblies having leaf springs of different degrees of stiffness for optimum operation in various speed ranges. Access to the governor rotor for inspection, adjustment, repairs, or replacement can be quickly obtained by removing the target disk 19 from the motor shaft and detaching the sleeve-carrying control housing 68 from the motor housing.

The modified form of speed governor shown in FIGS. 10 to 13 is generally similar to that of FIGS. 3 and 4, but is arranged for use in a control circuit requiring closing of governor contacts upon increase of motor speed. By way of example, the governor can be used to regulate the speed of a direct-current shunt motor 115, FIG. 13, including a rotatable armature 162 and a shunt field winding comprising a pair of series-connected winding sections 163, the motor being connected to direct-current line terminals 164 and 165. Motors of this type are commonly employed in teletypewriter receivers powered from a direct-current source, as in air-borne equipment.

The motor 115 has a shaft 18, as in FIG. 3, which carries thereon a governor rotor 122 generally similar to the rotor 22 of FIG. 3. The rotor 122 comprises an insulating disk 123 having a hub 24 attached to the shaft by set screws 25. A centrifugal switch 126 is mounted on the disk 123 and is generally similar to the switch 26 of FIG. 4 except that it has contacts 134 and 139 which are arranged to close upon increase of motor speed. The switch includes a vibratory arm 27 mounted on a bracket 31, as in FIG. 3, but the arm contact 134 faces outwardly and cooperates with the fixed contact 139 which is riveted or otherwise secured to the flat cut-away face of the headed stud 55. The retracted position of the vibratory arm is determined by a stop screw 184 threaded in the angle bracket 36 and retained in adjusted position by a lock nut 41, thus locating the side flanges 82 and 83 of the magnetizable arm in the proper spaced relation to the conical periphery of the axially shiftable biasing magnet 78.

Instead of being provided with collector rings, the governor rotor 122 of FIG. 10 is provided with a pair of flat semi-circular commutator segments 142 and 143, the segment 142 being electrically connected to the contact arm mounting bracket 31 by the rivets 33, and the segment 143 being electrically connected to the fixed contact 139 by the riveted stud 55. The insulating disk 123 is provided at its peripheral portion with diametrically opposite radial slots 185 aligned with the diametrically extending gap between the commutator segments to facilitate fanning away of commutator dust. A pair of brushes 145 and 146 carried on the end wall of the motor housing bear on the commutator for completing the circuit to the governor switch. The commutator serves to periodically reverse the current through the contacts so as to prolong the life of the contacts. The governor switch is shunted by the usual resistor 166 and capacitor 167, as seen in FIG. 13, the resistor being connected in series with the shunt field winding sections 163 and preferably at a point between these winding sections.

When the governor rotor is at rest, the resistor-shunting governor contacts are open. It is desirable, however, to start the shunt motor with a strong field, and for this purpose the governor disk is provided with a second centrifugal switch 186 connected in parallel with the governor switch and provided with cooperating contacts 187 and 188 which remain closed during the starting period, but open at a speed below the normal governed speed. The contact 187 is carried on the free end of a spring arm 189 which is riveted or otherwise anchored at its other end on an angle bracket 190, the bracket being secured to the disk and electrically connected to the commutator segment 143 by rivets 191. The cooperating contact 188 is carried on an angle bracket 192 which is secured to the disk and electrically connected to the commutator segment 142 by rivets 193. The governor disk is provided with riveted balancing studs 57 and with rivets 194 and 195 which secure the commutator segments to the disk.

In the operation of the governor-controlled shunt motor of FIGS. 10 to 13, the motor starts with the governor switch contacts 134 and 139 open, but with the field switch contacts 187 and 188 closed, and the motor accelerates to a speed at which the latter contacts open and remain open and then to a higher predetermined speed at which the spring-biased governor contact arm 27 moves outwardly by centrifugal force, thus engaging the arm contact 134 with the contact 139 and short-circuiting the shunt field resistor 166, so as to increase the field strength. The motor speed thereupon drops slightly, permitting the governor contacts to separate. The cycle of operation is then repeated, the switch arm 27 vibrating rapidly as in the device of FIG. 3, and the motor speed being maintained within close limits.

As in the governor of FIG. 3, the speed setting of the governor of FIG. 10 can be initially adjusted by means of the adjusting screw 53, and the speed setting can be finely adjusted while the motor is running by axially shifting the permanent magnet 78 carried on the adjusting sleeve 71.

The commutator segments 142 and 143 of FIG. 12 may also be applied to the governor rotor 22 for the motor of FIG. 3 in place of the collector rings in cases where this motor is to be operated on direct current.

I claim:

1. In a speed governor for an electric motor, a rotatable support, a centrifugal switch carried by said support and including a pair of cooperating contacts relatively movable to open and closed positions and further including a resiliently biased, centrifugally influenced vibratory arm controlling the opening and closing of said contacts, said arm having a magnetizable portion and having a plane of vibration normal to the rotational axis of said support, a normally stationary magnet of circular cross-section coaxial with said support and having a polarized periphery about the outer side of which said magnetizable arm portion is revoluble for exerting a continuous biasing force on said arm, and means for adjusting the magnetic effect of said magnet on said arm to vary the biasing force on said arm.

2. In a speed governor for an electric motor, a rotatable support, a centrifugal switch carried by said support and including a pair of cooperating contacts relatively movable to open and closed positions and further including a resiliently biased, centrifugally influenced vibratory arm controlling the opening and closing of said contacts, said arm having a magnetizable portion and having a plane of vibration normal to the rotational axis of said support, a normally stationary magnet of circular cross-section coaxial with said support and having a polarized periphery about the outer side of which said magnetizable arm portion is revoluble for exerting a continuous biasing force on said arm, and means for axially shifting said magnet to adjust the magnetic biasing force on said arm.

3. In a speed governor for an electric motor, a rotatable support, a centrifugal switch carried by said support and including a pair of cooperating contacts relatively movable to open and closed positions and further including a resiliently biased, centrifugally influenced vibratory arm controlling the opening and closing of said contacts, said arm having a magnetizable portion and having a plane of vibration normal to the rotational axis of said support, a normally stationary permanent magnet of circular cross-section coaxial with said support and having a polarized periphery about the outer side of which said magnetizable arm portion is revoluble for exerting a continuous biasing force on said arm, and means for adjusting the magnetic effect of said magnet on said arm to vary the biasing force on said arm.

4. In a speed governor for an electric motor, a rotatable support, a centrifugal switch carried by said support and including a pair of cooperating contacts relatively movable to open and closed positions and further including a resiliently biased, centrifugally influenced vibratory arm controlling the opening and closing of said contacts, said arm having a magnetizable portion and having a plane of vibration normal to the rotational axis of said support, a normally stationary magnet of circular cross-section coaxial with said support and having a polarized conical periphery about the outer side of which said magnetizable arm portion is revoluble for exerting a continuous biasing force on said arm, and means for axially shifting said magnet to vary the air gap between the conical periphery of said magnet and said magnetizable arm portion and thereby adjust the magnetic biasing force on said arm.

5. In a speed governor for an electric motor, a rotatable support, a centrifugal switch carried by said support and including a pair of cooperating contacts relatively movable to open and closed positions and further including a resiliently biased, centrifugally influenced vibratory arm controlling the opening and closing of said contacts, said arm having a magnetizable portion and having a plane of vibration normal to the rotational axis of said support, a normally stationary magnet of circular cross-section coaxial with said support and having a polarized periphery about the outer side of which said magnetizable arm portion is revoluble for exerting a continuous biasing force on said arm, said magnetizable portion of the arm being of channel cross-section and including inwardly directed flanges with concave edges substantially concentric with and adjacent to the periphery of said magnet, and means for adjusting the magnetic effect of said magnet on said arm to vary the biasing force on said arm.

6. In a speed governor for an electric motor, a rotatable support, a centrifugal switch carried by said support and including a pair of cooperating contacts relatively movable to open and closed positions and further including a resiliently biased, centrifugally influenced vibratory arm controlling the opening and closing of said contacts, said arm having a magnetizable portion and having a plane of vibration normal to the rotational axis of said support, a normally stationary magnet of circular cross-section coaxial with said support and having a polarized periphery about the outer side of which said magnetizable arm portion is revoluble for exerting a continuous biasing force on said arm, said magnetizable portion of the arm having a concave inner side substantially concentric with and adjacent to the periphery of said magnet, and means for adjusting the magnetic effect of said magnet on said arm to vary the biasing force on said arm.

7. In a speed governor for an electric motor, a rotatable support, a centrifugal switch carried by said support and including a pair of cooperating contacts relatively movable to open and closed positions and further including a resiliently biased, centrifugally influenced vibratory arm controlling the opening and closing of said contacts, said arm having a magnetizable portion and having a plane of vibration normal to the rotational axis of said support, a normally stationary magnet of circular cross-section coaxial with said support and having a polarized periphery about the outer side of which said magnetizable arm portion is revoluble for exerting a continuous biasing force on said arm, said magnet periphery presenting magnetic bands of opposite polarity at axially spaced regions thereof to establish a flux path crosswise of said arm, and means for adjusting the magnetic effect of said magnet on said arm to vary the biasing force on said arm.

8. In a speed governor for an electric motor, a rotatable support, a centrifugal switch carried by said support and including a pair of cooperating contacts relatively movable to open and closed positions and further including a resiliently biased, centrifugally influenced vibratory arm controlling the opening and closing of said contacts, said arm having a magnetizable portion and having a plane of vibration normal to the rotational axis of said support, a normally stationary magnet of circular cross-section coaxial with said support and having a polarized periphery about the outer side of which said magnetizable arm portion is revoluble for exerting a continuous biasing force on said arm, stop means limiting the inward displacement of said vibratory arm toward the magnet periphery, and means for adjusting the magnetic effect of said magnet on said arm to vary the biasing force on said arm.

9. In a speed governor for an electric motor, a rotatable support, a centrifugal switch carried by said support and including a pair of cooperating contacts relatively movable to open and closed positions and further including a resiliently biased, centrifugally influenced vibratory arm controlling the opening and closing of said contacts, said arm having a magnetizable portion and having a plane of vibration normal to the rotational axis of said support, a normally stationary magnet of circular cross-section coaxial with said support and having a polarized periphery about the outer side of which said magnetizable arm portion is revoluble for exerting a continuous biasing force on said arm, one of said contacts being mounted on said support and forming a stop limiting the inward displacement of said vibratory arm toward the magnet periphery, and means for adjusting the magnetic effect of said magnet on said arm to vary the biasing force on said arm.

10. In a speed governor for an electric motor, a rotatable support, a centrifugal switch carried by said support and including a pair of cooperating contacts relatively movable to open and closed positions and further including a resiliently biased, centrifugally influenced vibratory arm controlling the opening and closing of said contacts, said arm having a magnetizable portion and having a plane of vibration normal to the rotational axis of said support, a normally stationary magnet of circular cross-section coaxial with said support and having a polarized periphery about the outer side of which said magnetizable arm portion is revoluble for exerting a continuous biasing force on said arm, said contacts closing upon outward displacement of said vibratory arm, and stop means distinct from said contacts limiting the inward displacement of said vibratory arm toward the magnet periphery, and means for adjusting the magnetic effect of said magnet on said arm to vary the biasing force on said arm.

11. In a speed governor for an electric motor, a rotatable support, a centrifugal switch carried by said support and including a pair of cooperating contacts relatively movable to open and closed positions and further including a resiliently biased, centrifugally influenced vibratory arm controlling the opening and closing of said contacts, said arm having a magnetizable portion and having a plane of vibration normal to the rotational axis of said support, a normally stationary magnet of circular cross-section coaxial with said support and having a polarized periphery about the outer side of which said magnetizable arm portion is revoluble for exerting a continuous biasing force on said arm, a stationary housing extending about said rotatable support, and an axially shiftable adjusting member having a threaded connection with said housing coaxial of said support, said magnet being carried by said adjusting member for axial displacement thereby during the rotation of said support to adjust the magnetic biasing force on said vibratory arm.

12. In a speed governor for an electric motor having a projecting shaft, a stroboscope rotor carried by the outer end of said shaft, a rotatable support carried on said shaft at a region spaced inwardly from said rotor, a stationary housing surrounding said rotatable support, centrifugal switch means carried by said rotatable support and including a pair of cooperating contacts relatively movable to open and closed positions and further including a resiliently biased centrifugally influenced vibratory arm controlling the opening and closing of said contacts, said arm having a magnetizable portion and having a plane of vibration normal to the rotational axis of said support, an axially shiftable adjusting sleeve having a threaded connection with said housing coaxial of said shaft, said sleeve having a centrally apertured wall through which said shaft passes, said wall being disposed between said rotor and said rotatable support, and an annular magnet secured to said sleeve wall and having a conical periphery about the outer side of which said magnetizable arm portion revolves in adjacent relation thereto during the rotation of said shaft for exerting a continuous magnetic biasing influence on said arm, the axial displacement of said magnet by said threaded sleeve varying the biasing effect on said arm to adjust the speed setting of the governor.

13. In a speed governor for an electric motor, a rotatable support, a mounting bracket secured to a face of said support, said bracket including a resilient tongue and a projection overlying said tongue, said tongue extending longitudinally of said spring, a leaf spring having an end portion secured to said tongue, a centrifugally influenced vibratory arm underlying said spring and having an end portion secured to the other end portion of said spring, said arm having a free end portion, a contact secured to the free end portion of said arm, a cooperating contact secured to said support and periodically engaged by said first contact during the vibration of said arm, and an adjusting screw threaded in said projection and engaging said tongue for adjustably deflecting said tongue to impose an adjustable bias on said spring.

14. In a speed governor for an electric motor, a rotatable support, a mounting bracket secured to said support, a vibrator assembly comprising a relatively rigid, centrifugally influenced vibratory arm and a supporting and biasing leaf spring for said arm, said spring having an end portion secured to one end portion of said arm and the other end portion of said spring projecting toward the free end portion of said arm, means for detachably securing said last-named end portion of said spring to said bracket, said arm further having a contact at its free end portion, and a second contact secured to said support and periodically engageable by said arm contact during the vibration of said arm.

References Cited in the file of this patent
UNITED STATES PATENTS

| | | |
|---|---|---|
| 2,138,912 | Foss | Dec. 6, 1938 |
| 2,643,871 | Warrick | June 30, 1953 |
| 2,846,541 | Evans et al. | Aug. 5, 1958 |
| 2,920,158 | Walker | Jan. 5, 1960 |